J. SCHADE, Jr.
LOOSE LEAF BINDER.
APPLICATION FILED FEB. 24, 1915.
1,157,184.
Patented Oct. 19, 1915.
4 SHEETS—SHEET 1.
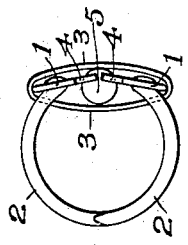
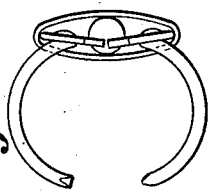
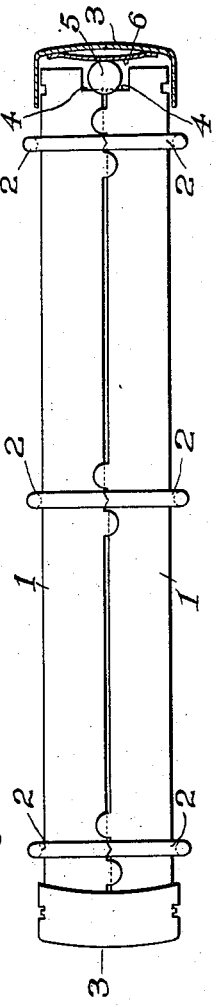
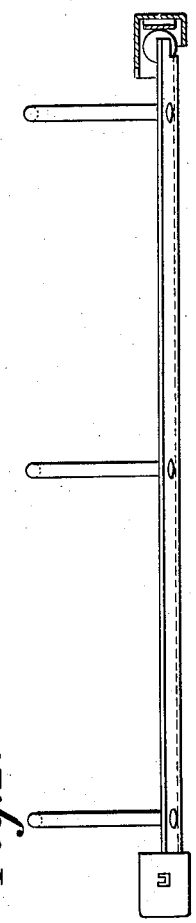
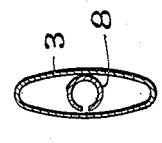
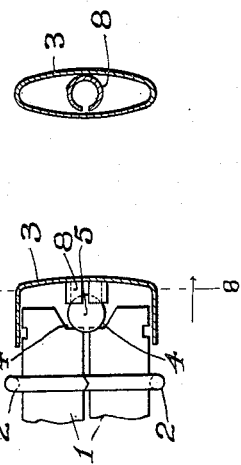
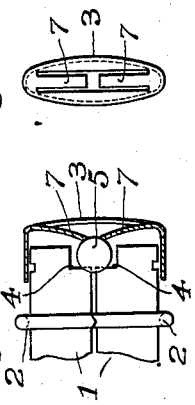
WITNESSES:
John Schade Jr.
By
ATTORNEY J. SCHADE, Jr.
LOOSE LEAF BINDER.
APPLICATION FILED FEB. 24, 1915.
1,157,184.
Patented Oct. 19, 1915.
4 SHEETS—SHEET 2.
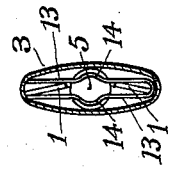
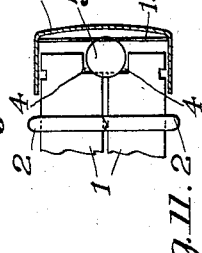
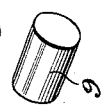
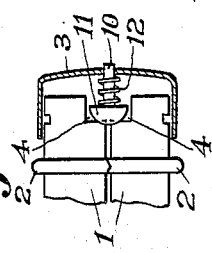
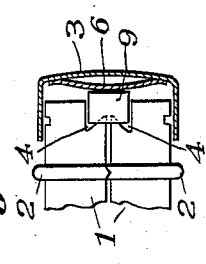
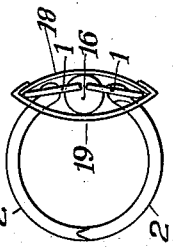
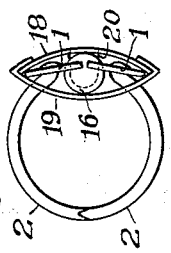
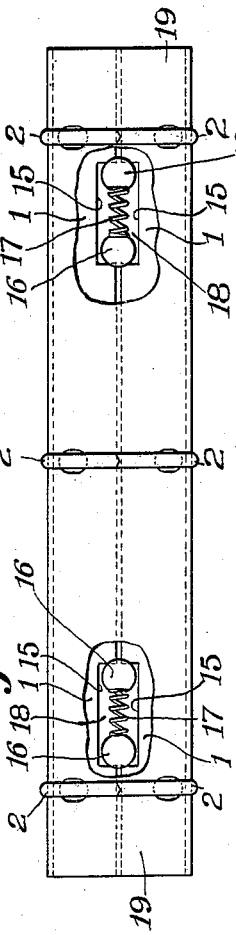
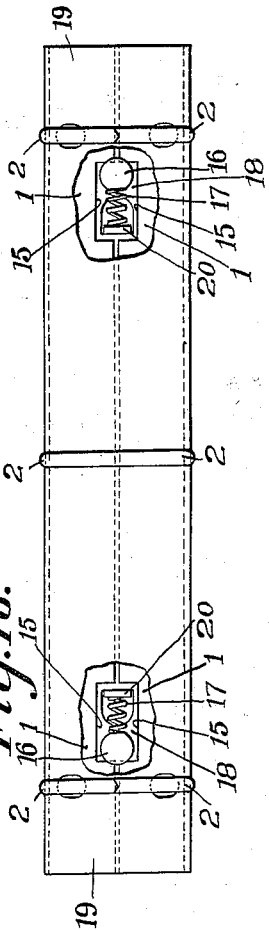
WITNESSES:
John Schade Jr.
By
ATTORNEY J. SCHADE, Jr.
LOOSE LEAF BINDER.
APPLICATION FILED FEB. 24, 1915.
1,157,184.
Patented Oct. 19, 1915.
4 SHEETS—SHEET 3.
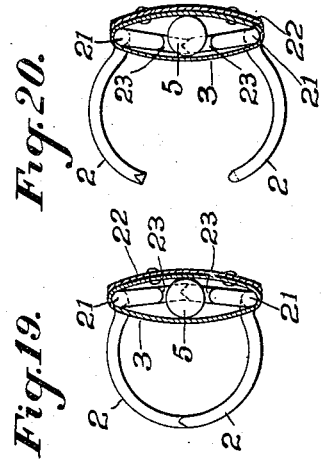
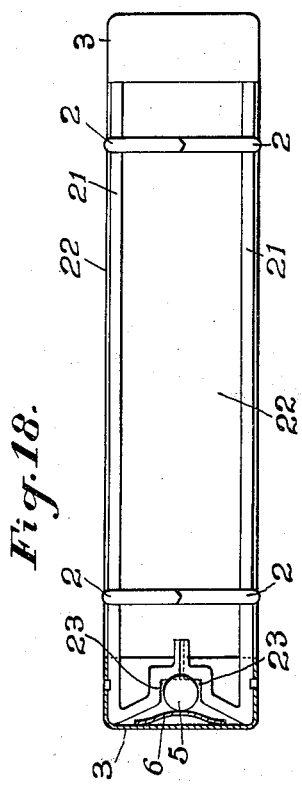
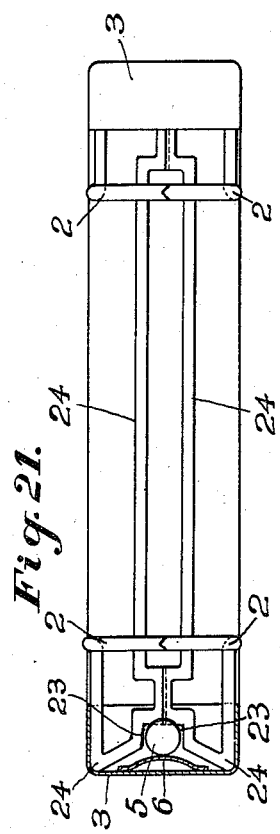
WITNESSES:
M. J. Longden
Emily R. Friss
John Schade Jr.
By
ATTORNEY

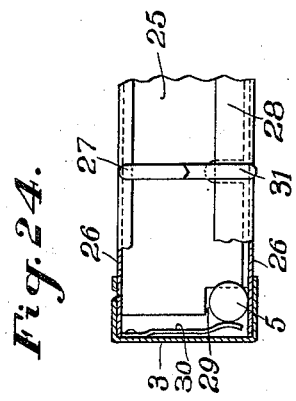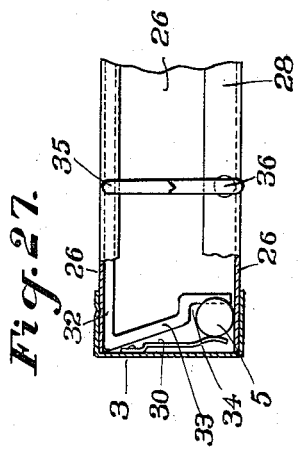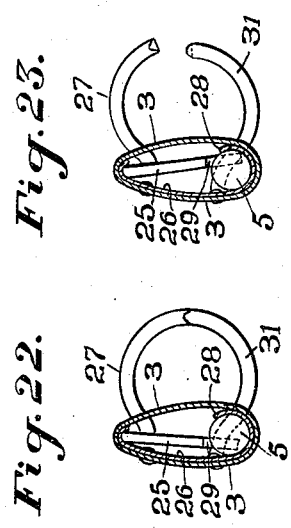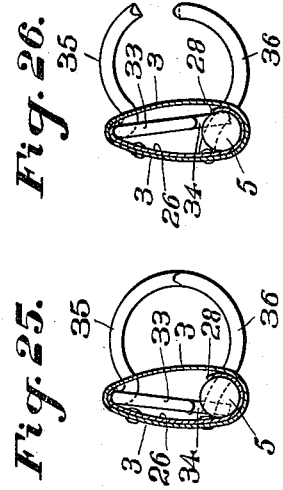

UNITED STATES PATENT OFFICE.

JOHN SCHADE, JR., OF BROOKLYN, NEW YORK, ASSIGNOR TO NATIONAL BLANK BOOK COMPANY, OF HOLYOKE, MASSACHUSETTS, A VOLUNTARY TRUST ASSOCIATION OF COPARTNERSHIP HAVING AS TRUSTEES J. W. TOWNE, F. B. TOWNE, E. S. TOWNE, J. M. TOWNE, AND F. W. WILSON.

LOOSE-LEAF BINDER.

1,157,184. Specification of Letters Patent. Patented Oct. 19, 1915.

Application filed February 24, 1915. Serial No. 10,257.

*To all whom it may concern:*

Be it known that I, JOHN SCHADE, Jr., a citizen of the United States, residing at the city of Brooklyn, county of Kings, State of New York, have invented certain new and useful Improvements in Loose-Leaf Binders; and I do declare the following to be a full, clear, and exact description of the invention, such as will enable others skilled in the art to which it appertains to make and use the same.

My invention has reference to loose leaf binders but more particularly refers to that class of such devices known as ring binders.

Ring binders, as commonly used, comprise one or more rocking elements to which latter are secured prongs which are complemental portions of rings. The rocking elements which carry the prongs readily permit the opening and closing of the latter and this is preferably effected with a spring action of some sort. In some instances one set of prongs is secured to a stationary part of the structure while the other set of such prongs opposite the first set is secured to a single rocking element. But the approved form of these ring binders comprises two rocking members having their inner edges close together and in pivotal relation these rocking members being suitably supported and each member carrying a set of prongs that are complemental portions of rings. When the prongs are opened the members will rock in one direction and when the prongs are closed such members will rock in the reverse direction, and as above stated these rocking movements of the members are preferably effected with a spring action, the spring element always exerting a tension on these members to keep the prongs opened or closed as the case may be. Many ways of utilizing a spring element in this connection have heretofore been proposed, such as supporting the prong carrying members within a spring trough, the formation of spring portions in the members themselves, the employment of resilient clasps which embrace the members athwart the same at suitable locations, or the introduction of special spring elements between the inner edges of the members, but my improvement is exceedingly radical in its nature and has nothing in common with spring devices of this sort and possesses an inherent novelty which will be readily appreciated and understood from the following description and will be set forth in the appended claims. In the accompanying drawings Figure 1 is a plan view of my improved ring binder with end cap sectioned away—Fig. 2 is a side elevation of my binder with one end cap sectioned—Fig. 3 is an end view with the cap and its adjoining spring and ball removed and showing the prongs closed—Fig. 4 a view similar to Fig. 3 showing the prongs opened—Fig. 5 a broken view of one end of a ring binder with the cap in section and showing a modified form of the spring element—Fig. 6 is a detail end view of the cap employed in the construction shown at Fig. 5—Fig. 7 is a view similar to Fig. 5 but showing a still further modification of the spring element—Fig. 8 is a section at the line 8—8 of Fig. 7—Fig. 9 is a view similar to Fig. 5, but showing a roller utilized instead of a ball—Fig. 10 is a view similar to Fig. 9 but showing a modified form of the spring impelled element—Fig. 11 is a perspective detail view of the roller 9—Fig. 12 is a view similar to Fig. 10 but showing a modified form of the spring—Fig. 13 is an end view of the structure shown at Fig. 12 with the cap sectioned away—Fig. 14 is a plan view of a ring binder with my improvement applied thereto at points midway the length thereof—Fig. 15 is an end view of the construction shown at Fig. 14—Fig. 16 is a view similar to Fig. 14 but showing a slightly modified manner of applying my improvement—Fig. 17 an end view of the structure shown at Fig. 16—Fig. 18 is a plan view showing my improvement applied to a ring binder in which the prong members are secured to wires, one of the end caps being sectioned away—Fig. 19 is an end view of the structure shown at Fig. 18 with the end cap and parts contiguous thereto sectioned away and with the spring removed—Fig. 20 is a view similar to Fig. 19 but showing the position of parts with the prongs opened—Fig. 21 is a view similar to Fig. 18 but showing my improvement applied to a wire structure in which the respective prong elements and their rocking members are integral—Fig. 22 is an end view with the cap and contiguous portions sectioned away and my improvement applied to a form of ring binder in which one set of prongs is stationary while the other set is carried by a single rocking element, the parts being shown in the position that they occupy with the prongs closed—Fig. 23 is a view similar to Fig. 22 but showing the position of parts with the prongs opened—Fig. 24 is a broken plan view, with the end cap sectioned away, of the structure shown at Fig. 22—Fig. 25 is a view similar to Fig. 22 except that the rocking element which carries the movable prongs is made of wire—Fig. 26 is a view similar to Fig. 23, except that the rocking element which carries the movable prongs is made of wire, and Fig. 27 is a broken plan view, with the end cap sectioned away, of the structure shown at Fig. 25.

Similar numerals of reference denote like parts in the several figures of the drawing.

Referring to Figs. 1, 2, 3, and 4, my improvement, as applied to one form of ring binders, contemplates a pair of elongated plate-like members 1 having pivoted relation at their inner edges and carrying prongs 2, which construction is quite common and requires no further description. It is necessary to support these members 1 in some manner in order that they may preserve their pivotal relation, and I therefore prefer to employ caps 3 which are secured to the ends of the members 1 in any suitable manner so as to prevent accidental withdrawal, while at the same time these end caps, although they are perfectly rigid, do not embrace the outer lateral edges of the members 1 so snugly as to prevent free rocking movements of said members. This construction as thus far described provides a loose leaf binder of the ring type which is quite common and is operable for the purpose of holding loose leaves, but such construction does not possess the snappy, spring nature which the commercial ring binder must possess, and it is this spring feature to which my invention intimately relates and which I will now describe. The members 1 at each of their ends are cut away so as to form pockets 4 each cut away portion on a member forming a complemental part of the pocket as a whole.

Each end of the binder is precisely alike, and therefore I will confine my description to one end only, since this will be sufficient to give a clear understanding of my invention.

Within the pocket 4 is a metal ball 5 which is backed by a bow spring element 6 positioned against the end of the cap. The ball is confined as against undue lateral movement by the side walls of the pocket 4 and as against any undue movement at right angles thereto by the upper and lower walls of the cap. The spring is always at a tension and therefore the ball is always impelled against the ends of the members 1 at their meeting edges, so that when the prongs are opened the balls will shoot forward beneath the members, and thereby impart a spring action to these members which action is constant and will hold the latter firmly with the prongs in opened position. It will be readily understood that the ball will pass beneath the members 1 only at its minor diameters since the major diameters of the ball are such that said ball cannot possibly pass between the bottom of the cap and the members themselves. When the prongs are closed the members 1 will thrust against the ball and drive it backward against its resiliency until said members are passing below an alined position whereupon the ball will again be projected and will override the members at the minor diameters of such ball so as to cause these members to close with a spring action and to firmly hold the prongs in their closed position. The construction just described utilizes a bow spring, which is a good and very convenient form of spring for the purposes of my invention, but it will, of course, be apparent that the particular form of spring employed is not of the essence of my invention, and therefore at Figs. 5 and 6 I have shown spring tongues 7 lanced out of the end of the cap and driven inwardly so as to act as spring elements and constantly place the ball under tension. Also, in Figs. 7 and 8 I have shown a form of spring which consists of a spring collet 8 which is assembled loosely against the end of the cap and within which the ball seats, and in this connection I would say that the ball at its minor diameters is always seated within this collet so that the latter is always distended somewhat, the result being that the ball is always under tension.

The constructions heretofore described contemplate the use of balls which later I prefer to employ in all structures, but it will, of course, be obvious that my invention should not be limited in this respect, and therefore at Fig. 9 I have shown a structure in all essentials like that heretofore described, with the exception that instead of the ball I employ a roller 9 which is backed by the spring element, and operates precisely in the same manner as that above described with respect to the ball itself. Instead of the ball or the roller, I can employ the structure shown at Fig. 10, consisting of a pin 10 loosely passing through the end of the cap and terminating at its inner end in a half round head 11, a coil spring 12 being confined between the head and the cap so that this head is always impelled by the spring against the members 1, so as to serve precisely the same purpose as the ball itself. Referring to Figs. 12 and 13, I would say that these structures are precisely like that shown at Fig. 1 except as to the spring element, which latter in these figures more closely resembles the spring element shown in Figs. 7 and 8. But in these Figs. 12 and 13 I have shown a spring 13 shaped somewhat like a hairpin and confined in the end of the cap, and the central portions of the spring are swelled out somewhat as shown at 14 so as to provide a seat for the ball which latter rests in this swelled out portion and always is seated therein to an extent sufficient to constantly place the ball under tension for the purposes hereinbefore described.

I have heretofore shown and described the flat plate-like members 1 equipped at the ends for coaction with the spring impelled member, but my invention is by no means confined to the ends of the binder, and, referring to Figs. 14 and 15, I have shown the members 1 cut away at portions intermediate their ends so as to form pockets 15, each cut away portion of the respective members forming, as in the instance above described, a complemental portion of the pocket as a whole. Within these pockets at both ends thereof are metal balls 16, and coil springs 17 are located in the space between the balls and exert a constant pressure thereagainst, so that the balls will always be spring impelled. The balls themselves contact the edges of the members 1 just as in the construction hereinbefore described, and the side walls of the pockets 15 restrict the lateral movements of the balls, while a bottom plate 18 and a cover plate 19 are employed which confine the balls as against vertical displacement. The operation and function of these balls are precisely the same as the operation and function of the balls heretofore described with respect to Fig. 1.

While I prefer to utilize the balls, when applied intermediate the ends of the binder, as I have shown at Fig. 14, and as I have just described above, nevertheless I can omit one of the balls in each of the pockets 15 and a backing may be afforded for the spring by extending a lug 20 upwardly from the bottom plate 18 as shown at Figs. 16 and 17, and in this instance there would be no change whatsoever in the operation and function of the balls.

Loose leaf binders of the ring type do not always employ the flat plate-like members 1, but the prongs are sometimes secured to mere rock shafts that are made of wire and suitably supported, and at Figs. 18, 19, and 20, I have shown a wire structure of this sort, in which two elongated wires 21 are properly supported within a bottom plate 22 the prong members being riveted or otherwise suitably secured to these wires. The end portions of these wires are bent inwardly and formed into complemental portions of a pocket 23, and the extreme ends of the wires are extended inwardly and constructed so as to have a rocking engagement after the manner of wire structures commonly used.

Within the pocket 23 is the ball 5 backed up by a suitable form of spring 6, and the ends are surrounded by the cap 3 in the same manner as heretofore described with respect to Fig. 1, and it will be perfectly clear that the operation and function of the parts in this particular instance is precisely the same as the operation and function of the parts heretofore described with respect to Fig. 1.

With further reference to these Figs. 18, 19, and 20, I would say that while I have shown a bottom plate, it will, of course, be obvious that such plate is not at all essential to the successful operation of my improvement.

In Fig. 21 I have shown an all wire structure of prong and rocking elements, in which each rocking element has integral therewith its complemental prong members, and as this construction is well known I will merely say that the numeral 24 designates the rocking elements and that at their ends they are bent inwardly in the same manner as at Fig. 18 to form the pockets 23, the operation and function of the parts so far as my improvement is concerned being the same as has been heretofore described.

The descriptions heretofore given all relate to loose leaf binders of the ring type which comprise two pivotally related prong carrying members properly supported, so that in operation, all the prongs have opening and closing movements, but in some instances one set of prongs is stationary while the other complemental set is movable, and I have therefore shown in Figs. 22, 23, and 24, a construction which only employs one movable member 25 which has a rocking contact along one edge of a bottom plate 26, the member 25 being substantially as wide as this bottom plate and carrying prongs 27. The opposite edge of the plate 26 is curled around as shown at 28 so as to overhang the member 25 and acts as a stop to limit the upward swing thereof. Around the extremity of this bottom plate and portion 28 is secured the cap 5, and a pocket 29 is formed within the end of the member 25 at the free edge thereof and within this pocket is located the ball 5 which is backed up by a suitable leaf spring 30 secured to the inside of the cap and constantly bearing against the ball.

The portion 28 of the bottom plate and the inside bottom surface of the latter prevent vertical displacement of the ball, which latter is always spring impelled against the edge of the member 25 so as to alternately ride above and below the same during the operation of the movable prongs 27, the function and operation of this ball being precisely the same as heretofore described.

Attached to the bottom plate are the stationary prongs 31 with which the movable prongs coöperate.

While the construction shown and described, with reference to these Figs. 22, 23, and 24, contemplates the employment of a bottom plate with a rocking contact for the member 25 and with the curled over portion 28, it will be clear that this bottom plate may be perfectly plain with no upstanding edges whatever, since the end caps will afford a rocking contact for the member 25 and will limit the vertical play of the balls, just as has been heretofore described with reference to the structure shown at Fig. 1, and therefore in utilizing my invention in the manner shown at Figs. 22, 23, and 24, I do not wish to be limited to any particular formation of the bottom plate.

Instead of making the single rocking member in plate form it may be made of wire as shown at Figs 25, 26, and 27, in which instance a wire rod 32 is suitably supported within one edge of the bottom plate 26 so as to be capable of rocking movements, and the extremities 33 of this wire are extended inwardly to a point near the opposite edge of the plate 26 and are formed into a pocket 34 within which latter is confined the ball 5 backed by the spring 30, this ball being restricted as to vertical movements by the overhanging portion 28 of the plate 26 and by the bottom surface of the plate itself, just as has been above described with respect to Figs. 22, 23, and 24.

The movable prongs 35 are secured to the wire rod 32 by riveting or in any other suitable manner, while the stationary prongs 36 are secured to the bottom plate 26, and the end caps 3 are placed around the extremities of the bottom plate and the portions 28, as above described.

With further reference to these Figs. 25, 26, and 27, I would call attention to the fact that the bottom plate may be perfectly plain with no upstanding edges since the rod 32 may be suitably supported within the end caps while the upper and lower surfaces of the latter will properly limit the vertical movements of the ball.

From the foregoing description it will be obvious that my invention constitutes a wide departure from structures hitherto identified with loose leaf binders of the ring type, and it will likewise be clear that my improvement is applicable to many forms of binders of this class, and therefore I do not wish to be limited as to any particular manner of utilizing my invention, the gist of which rests in the broad idea of imparting a spring action to a rocking prong carrying member or members by means of a spring impelled element that is constantly applied against the ends of said member or members or against any corresponding portion thereof throughout their length, so that such element always tends to override the member or members.

Having thus described my invention what I claim as new and desire to secure by Letters Patent is:—

1. In a loose leaf binder, a support, a prong carrying member rockingly mounted thereon, a loosely mounted spring impelled element engaging said member at its edge and tending to override the latter and to hold the same in position with the prongs opened or closed.

2. In a loose leaf binder, a support, a prong carrying member rockingly mounted thereon, and a spring impelled element mounted and contained within restricted limits to prevent accidental displacement of said element, the latter always tending to override said member.

3. In a loose leaf binder, a pair of pivotally connected prong carrying members, a support therefor, and a spring impelled element constantly under tension which tends normally to override said members.

4. In a loose leaf binder, a pair of pivotally connected prong carrying members, a support therefor, said members capable of rocking movements within said support, and a loosely mounted spring impelled element engaging said members and always acting to maintain the members with the prongs in either open or closed position.

5. In a loose leaf binder, a support, a pair of prong carrying members mounted thereon and capable of rocking and having pivotal relation at their inner edges, and a loosely mounted spring impelled element engaging said members and normally tending to keep them out of alinement.

6. In combination, a pair of prong carrying members having pivoted relation at their inner edges, means for confining said members in their pivoted relation, and spring impelled means which constantly tend to override said members at their meeting edges.

7. In combination, a pair of prong carrying members having pivoted relation at their inner edges, means for confining said members in their pivoted relation, and spring impelled means adapted to operate within restricted limits and constantly tending to override said members at their meeting edges.

8. In a device of the character described, a support, a movable prong carrying member mounted thereon, and a loosely mounted retaining element confined as against displacement and constantly impinged against said member to hold the same firmly with the prongs opened or closed but resiliently permitting the movements of said member.

9. In a device of the character described, a support, prong carrying members pivotally related at their inner edges and mounted to rock about their outer edges within said support, and a spring pressed element which is constantly impinged against the pivoted edges of said members so as to be projected above or below the latter when said prongs are respectively closed or opened.

10. In a device of the character described, a support, a prong carrying member rockingly mounted thereon and provided with a pocket, and a spring impelled ball loosely confined within said pocket and by the top and bottom of said support, said ball being constantly impinged against said member and tending normally to override the same.

11. In a device of the character described, a support, a prong carrying member rockingly mounted thereon, and a spring impelled ball loosely confined and adapted to constantly operate against the member to render its movements resilient.

12. In a device of the character described, a support, a prong carrying member mounted in said support and capable of rocking movements about its outer lengthwise edge, and a spring impelled element which bears constantly against a width edge of said member in the direction of its length and always tending to override said member.

13. In a device of the character described, a support, a pair of prong carrying members mounted therein to rock along their outer lengthwise edges and pivotally related at their inner edges, and a spring pressed element which constantly impinges against the members at width edges and in the direction of their length.

14. In a device of the character described, a support, a prong carrying member rockingly mounted thereon, and a loosely confined spring impelled element having varying diameters, said element at its minor diameters always tending to override said member, while the major diameters of said element prevent displacement of the latter.

15. In a device of the character described, a support, a pair of prong carrying members pivotally related at their inner edges and rockingly mounted in said support, and a loosely mounted spring impelled element which always impinges against said members at or about their pivotal point and always overrides said members when they are out of alinement.

16. In a device of the character described, a support, a pair of prong carrying members having pivotal relation at their inner edges and mounted within said support and capable of rocking movements, and a loosely mounted spring impelled element having varying diameters, said element always overriding said members when out of alinement, and the major diameters of said element being greater than the distance between the planes of the pivotal points of said members in opened and closed positions.

17. In a device of the character described, a support, a member mounted therein and adapted to rock along its outer lengthwise edge, and a spring impelled element restricted in its movements within certain limits, said element always impelled to override said member in the direction of the length of the latter.

18. In a device of the character described, a support, a pair of prong carrying members pivotally related and mounted within said support and capable of rocking movements about their outer edges, and a spring impelled element loosely mounted and operating within restricted limits and always overriding the members when the prongs are either opened or closed.

19. In a device of the character described, a support, prong carrying means movably mounted thereon, a ball adapted to operate against said means, and spring means acting entirely on and through the ball to render the movements of the prong carrying means resilient.

20. In a device of the character described, a support, prong carrying means movably mounted thereon, a ball, and a spring acting entirely on and through the ball whereby the latter is impinged against said means to hold the prongs open and closed but resiliently permitting the movements thereof.

21. In a device of the character described, a support, prong carrying means mounted thereon, a ball positioned to override said means, and a resilient element adapted to constantly cause an overriding tendency between said means and element.

22. In a device of the character described, a support, prong carrying means movably held thereby and having rocking movements about the outer lengthwise edges thereof, and a loosely mounted spring element operating within restricted limits against said means at width portions thereof.

In testimony whereof I affix my signature in presence of two witnesses.

JOHN SCHADE, Jr.

Witnesses:
J. W. TOWNE,
JOHN T. CONDON.

Copies of this patent may be obtained for five cents each, by addressing the "Commissioner of Patents, Washington, D. C."